March 2, 1943.    A. FRANZ    2,312,399
COOLING EXHAUST CONDUITS
Filed July 6, 1939
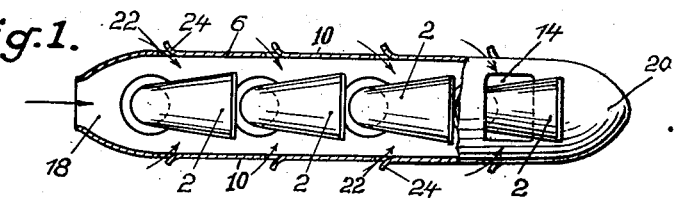
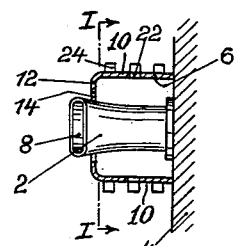
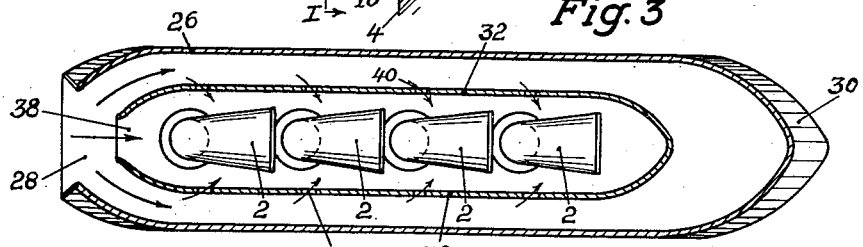
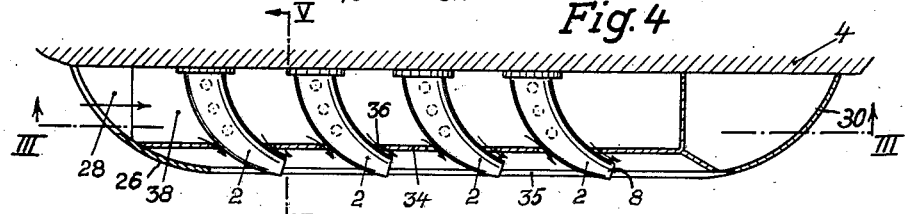
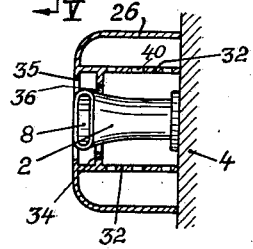
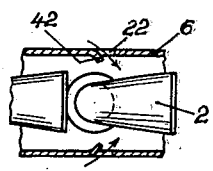
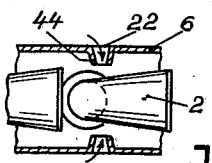
Inventor:
Anselm Franz,
Attorneys Patented Mar. 2, 1943

2,312,399

UNITED STATES PATENT OFFICE 2,312,399

COOLING EXHAUST CONDUITS

Anselm Franz, Dessau, Germany; vested in the Alien Property Custodian

Application July 6, 1939, Serial No. 283,099
In Germany July 9, 1938

12 Claims. (Cl. 60—35.6)

This invention is directed to the cooling of exhaust conduits extending from aircraft engines, especially where the exhaust conduits are in the form of nozzles directed rearwardly of the aircraft in order to aid in the forward propulsion of the aircraft because of the recoil action taking place as gases are emitted from the nozzles.

Such exhaust conduit nozzles are very short in length and are designed to have high gas pressures therein in order to accomplish an efficient recoil action. Consequently the nozzles are subject to great heat and pressure. The nozzles must be kept relatively cool or else they will deform under the heat and pressure and their nozzle form will be destroyed, with a resultant loss of efficiency. Simple exposure of the nozzles to the air stream passing the aircraft does not give adequate cooling of these nozzles.

It is an object of the instant invention to provide a cowling enclosing the individual exhaust conduits in order to obtain a more efficient cooling of the conduits.

Another object of the invention is to increase the pressure of the air flowing about the exhaust conduits so that a more effective cooling of the conduits takes place than is obtained from an unconfined air stream.

Another object of the invention is to direct cooling air in the form of air jets against the exhaust conduits.

Another object of the invention is to confine air flowing by the conduits so that an increase of air pressure is obtained.

Generally, these objects of the invention are obtained by enclosing the individual exhaust pipes within a cowling which has openings therein for the admission of cooling air, and further openings therein for ejection of the cooling air in such a manner as to supplement the recoil action produced by the individual exhaust nozzles themselves.

These and other objects of the invention are obtained by the following structures described with reference to the accompanying drawing, in which:

Fig. 1 is a cross-sectional view along the line I—I in Fig. 2, and showing one form of the invention.

Fig. 2 is a cross-sectional view of the invention shown in Fig. 1.

Fig. 3 is a view similar to Fig. 1 of a modified form of the invention, said view being along the line III—III of Fig. 4.

Fig. 4 is a longitudinal sectional view of the modified form of the invention shown in Fig. 3.

Fig. 5 is a cross-sectional view on the line V—V of Fig. 4.

Fig. 6 is a sectional view showing a modified port arrangement; and

Fig. 7 is a view similar to Fig. 6, showing a further modified port arrangement.

In Figs. 1 and 2, individual exhaust conduits 2 extend from the exhaust ports in engine block 4 of an air-craft engine. These exhaust conduits are in the form of relatively short nozzles having constricted outlets which are directed toward the rear of the aircraft, and which, by their novel construction, produce a recoil from the exhaust gases emitted therefrom, which recoil aids in the forward propulsion of the aircraft. To cool these nozzles a cowling 6 is provided, which cowling encloses substantially all except the ends 8 of the nozzles 2, which project outwardly of the cowling. Said cowling comprises walls 10 extending outwardly from the engine block, said walls terminating in inwardly turned flanges 12 which are spaced from the nozzles 2 by openings 14 for a purpose later described.

Cowling 6 is opened at its forward end at 18, and is closed at its rearward end 20, said cowling being given substantially a streamlined shape in order to reduce the drag of the nozzles 2. Openings 22 are formed in the walls 10 of cowling 6, these openings being easily made by slitting and bending walls 10 to form flanges 24 which function as baffles to aid in the entrance of air to the interior of cowling 6. These openings 22 are located on opposite sides of the conduits 2 in order to produce jets of air against the conduits.

As air enters cowling 6, through opening 18, its velocity is retarded and its pressure is increased, so that air moving more slowly and with greater pressure passes by the exhaust conduits 2 and absorbs heat therefrom. The openings 22 aid in the admission of more air into the interior of cowling 6 and thus create a greater air pressure therein. The heated compressed air escapes through openings 14 with expansion.

In Figs. 3, 4 and 5 a modified form of the invention is illustrated in which cowling 26, provided with an air inlet opening 28, encloses exhaust conduits 2. This cowling has its rearward end closed at 30. Within cowling 26 is mounted a second cowling 32, similar to cowling 6 of Figs. 1 and 2. Wall 34 of cowling 32 terminates short of the ends 8 of conduits 2, and is spaced from the conduits to form openings 36 which function as openings 14 in Fig. 1. The outer edges 8 of the exhaust conduits 2 terminate in substantially the same plane as the outer edge 35 of cowling 26, this creating a better streamlined covering for the conduits 2 than exists in the construction of Fig. 1. As in Fig. 1, air enters through the opening 28 in cowling 26 to and through the opening 38 of cowling 32, and passes with increased pressure and reduced speed around conduits 2, and thence is exhausted through the nozzle like openings 36. Cowling 32 is provided with openings 40 through which air entering opening 28 and passing outwardly of cowling 32 enters into the interior of cowling 32 to increase the pressure of the air surrounding conduits 2. This construction has the further advantage of providing an air insulating space between cowlings 26 and 32, so that leakage of noxious exhaust gases from the exhaust pipes cannot enter beneath the covering of the aircraft into the interior of the aircraft. Heat insulation is likewise obtained by this construction.

A modified form of baffle is shown in Fig. 6, wherein the openings 22 are formed in cowling 6 by flanges 42 turned inwardly rather than outwardly of conduit 6. As shown in Fig. 7, openings 22 can be constructed in the shape of nozzles 44 attached to the interior wall of conduit 6. Nozzles 44 increase the jet-like form of the streams of air impinging upon the exhaust conduits, thus facilitating cooling of the same. In all the figures it is noted that the openings 22 and 40 lie in rows opposite the exhaust conduits so that the air streams entering the holes are directed upon the conduits 2.

This invention achieves not only a cooling of the exhaust conduits functioning as recoil nozzles, but at the same time the cooling air itself is heated and discharged in the nature of an exhaust gas from the cowling so that its expansion is utilized to produce a recoil action to aid in the forward propulsion of the aircraft.

Having now described a means by which the objects of this invention may be obtained, what I claim and desire to secure by Letters Patent is:

1. In an engine, a row of exhaust conduits projecting from said engine, a substantially streamlined cowling enclosing all except the outlet ends of said conduits and being spaced from said conduits to form an air outlet through said cowling at each conduit, said cowling being open at its leading edge and closed at its trailing edge, a plurality of openings in the walls of said cowling adjacent each conduit, and means adjacent each opening for directing air in the form of jets against said conduits, said air being discharged from said cowling through the air outlets.

2. A cowling construction for an engine having a plurality of exhaust conduits in the form of recoil nozzles projecting therefrom comprising an inner cowling and an outer cowling spaced from said inner cowling, each of said cowlings having side walls surrounding said conduits, and said inner cowling having another wall through which the ends of said conduits project, means for admitting air with an increase of air pressure within said inner and outer cowlings including the space therebetween, and means for exhausting air along said conduits through said other wall of said inner cowling.

3. In a construction as in claim 2, a plurality of openings in the side walls of said inner cowling adjacent each conduit for the admission of air into said inner cowling from the space between said inner and outer cowlings.

4. In a construction as in claim 2, said other wall of said inner cowling having apertures therein through which said conduits project, said apertures being larger than said conduits and forming exhaust openings for air within said inner cowling.

5. A cowling construction for a plurality of exhaust conduits projecting from an engine comprising side walls surrounding said conduits, another wall having openings through which the ends of said conduits project, said openings being larger than said conduits to form a space therebetween, an opening at one end of said cowling for the admission of air into the interior of said cowling, and openings in the side walls of said cowling adjacent said conduits for the further admission of air to the interior of said cowling.

6. A construction as in claim 5, baffle means bent outwardly of said side walls adjacent each opening in said side walls.

7. A construction as in claim 5, baffle means bent inwardly of said side walls adjacent each opening in said side walls.

8. A construction as in claim 5, a plurality of nozzles secured to the inner side of said cowling and surrounding each opening.

9. A cowling for individual exhaust conduits projecting from an aircraft engine and having their outlet ends directed opposite the direction of aircraft flight in the form of recoil nozzles exhausting directly into the atmosphere comprising side walls forming an air passage common to the conduits, means for introducing cooling air into one end of said passage, means introducing cooling air through said side walls adjacent each conduit, another wall through which the outlet ends of said conduits project, and means for exhausting air from said passage through said other wall and along said individual conduits.

10. A cowling as in claim 9, said means for introducing air into an end of said passage comprising an opening in the forward end of said cowling, and said cowling being closed at its rearward end.

11. A cowling for the exhaust conduits of an internal combustion engine in which said conduits extend from the engine with their discharge ends bent toward the rear of the engine in the form of individual recoil producing nozzles discharging directly into the atmosphere, comprising two side walls making an air passage common to said conduits, said walls being spaced to leave an air opening at the forward end of said passage, and being joined to close the rear end of said passage, a plurality of apertures in each side wall adjacent each conduit, and another wall covering said passage and having a plurality of openings therein, each opening being for, and larger than, the outlet end of each conduit and through which the outlet ends of said conduits project to discharge exhaust gases into the atmosphere.

12. A cowling as in claim 11 in which said cowling is of streamlined shape, and said opening is disposed in the leading edge of said cowling.

ANSELM FRANZ.